INTEGRATOR FOR PERIODICALLY RECURRING SIGNALS
Filed Aug. 24, 1961
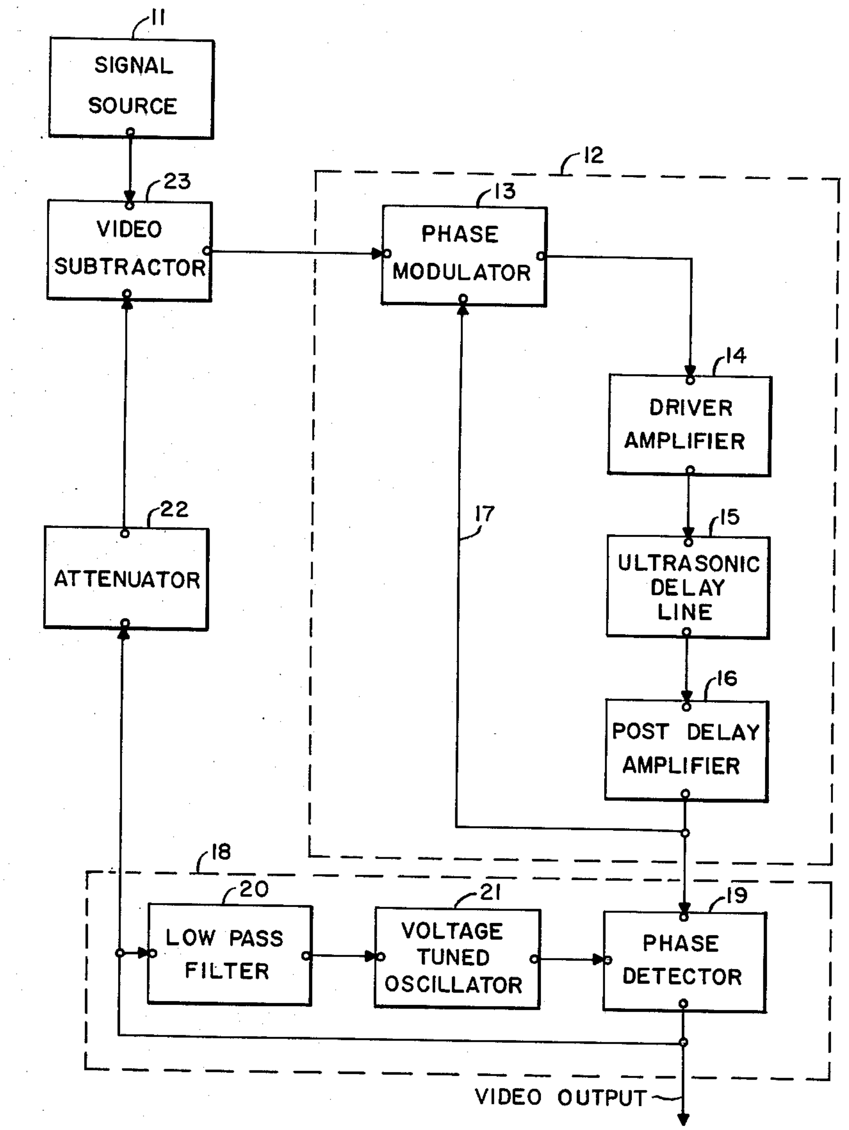

3,201,702
INTEGRATOR FOR PERIODICALLY RECURRING SIGNALS

Joseph D. Hanulec, Woodbury, and Carl E. Schwab, Farmingdale, N.Y., assignors to Hazeltine Research Inc., a corporation of Illinois Filed Aug. 24, 1961, Ser. No. 133,652
5 Claims. (Cl. 328—127)

This invention is concerned with an integrator for improving the signal-to-noise ratio of periodically recurring signals.

The term "integrator" as used here refers to a device wherein successive synchronous signals (signals which recur at a given constant repetition rate) are combined with each other while asynchronous signals (random noise and recurring signals which do not recur at the given repetition rate) which are received during successive repetition periods of the synchronous signals are effectively not combined with each other. The apparent amplification of synchronous signals and rejection of asynchronous signals produced by this device provides an improvement in signal-to-noise ratio with respect to the desired recurring signals.

The term "sample of the carrier signal" or merely "sample" as used here refers to a number of cycles of a radio frequency carrier signal generated during one repetition period of given periodically recurring signals.

An explanation of the theory and operation of a simple, idealized integrator is contained in applicants' copending application Serial No. 106,332, filed April 28, 1961, J. D. Hanulec and C. E. Schwab, Integrator for Periodically Recurring Signals. The referenced application describes an integrator which is related to the integrator herein described in that both devices may be classified as PM (phase-modulation) integrators. Characterization of an integrator as PM, FM (frequency-modulation) or AM (amplitude-modulation) refers to the method used for impressing signals upon a high-frequency carrier signal preparatory to integrating the recurring signals. Prior art integrators used either AM or FM techniques.

In general, all three types of integrators operate by modulating a high-frequency carrier signal with the signals to be integrated, delaying (or storing) the modulated carrier for a time interval equal to the repetition period of the desired recurring signals, feeding the delayed modulated carrier back to be cumulatively modulated by successive recurring signals and detecting the cumulative modulation of the carrier to produce a replica of the recurring signals having an improved signal-to-noise ratio.

The prior art AM and FM integrators have several undesirable characteristics. In particular, the circuitry required for the FM integrator includes several frequency mixers and complex filtering networks to eliminate undesired mixer products. The AM integrator requires exceptionally linear modulators and demodulators and a highly stable and precise automatic-gain-control system to prevent the integrator from becoming an unstable feedback system. That is, since the output of the integrator is continuously fed back to the input to be cumulatively increased as signals are received, the system loop gain must be precisely controlled to prevent the integrator from becoming unstable. However, applicants have found that a PM integrator may be constructed to avoid the difficulties encountered in prior art integrators and to provide improved performance with a decrease in circuit complexity.

It is an object of the present invention, therefore, to provide an integrator for improving the signal-to-noise ratio of periodically recurring signals which avoids one or more of the disadvantages of prior art systems.

It is a further object of the present invention to provide an integrator for periodically recurring signals which is comparatively simple to construct and operate.

It is a further object of the present invention to provide a phase modulation integrator for periodically recurring signals including a degenerative signal loop for controlling the accumulation of the desired recurring signals.

It is a further object of the present invention to provide a phase modulation integrator for periodically recurring signals which has a feedback factor close to 1 for improved signal-to-noise characteristics.

In accordance with the invention an integrator for improving the signal-to-noise ratio of periodically recurring signals comprises means for producing a radio-frequency carrier signal and means for causing the recurring signals to produce, during successive repetition periods, a cumulative phase change of the carrier signal. The integrator further comprises means, for detecting the phase change to provide an enhanced replica of the recurring signals, including a source of reference phase oscillations, means for varying the reference phase to correspond with the average phase of the radio-frequency carrier signal and a phase detector responsive to the instantaneous phase difference between the reference phase oscillations and the carrier signal. Finally, the integrator comprises means for subtracting a portion of the enhanced replica from the recurring signals so as to degeneratively control the cumulative phase change of the carrier signal.

For a better understanding of the present invention, together with other and further objects thereof, reference is had to the following description taken in connection with the accompanying drawing, and its scope will be pointed out in the appended claims.

The drawing is a block diagram of a phase modulation video integrator embodying the present invention. The video integrator will be described as it would be applied in a radar system, an environment in which it is particularly useful.

Referring to the drawing, an integrator for periodically recurring signals embodying the invention comprises a source of input signals 11 such as a radar receiver. The integrator further includes means for producing a radio-frequency (RF) carrier signal. The means for producing the RF carrier may, for example, be closed loop oscillatory system 12 (hereafter referred to as RF loop 12) which is tuned to the desired carrier frequency and has a gain of 1. RF loop 12 includes means for causing the input signals to periodically vary the phase of a sample of the carrier signal. This last-mentioned means includes phase modulator 13, driver amplifier 14 coupled to the output of phase modulator 13, and means for delaying the modulated sample for a period equal to the repetition period of the desired radar signals. The means for delaying the modulated sample may, for example, be ultrasonic quartz delay line 15. The output of delay line 15 is coupled to post delay amplifier 16, which, in turn, is coupled to means for returning the delayed sample to modulator 13 as the next recurring signal is received so that desired signals produce a cumulative phase change of the carrier signal. The last-mentioned means is shown as feedback coupling 17 which also serves to close RF loop 12.

The output of post delay amplifier 16 is also coupled to means 18 for detecting the carrier signal phase variations so as to provide an enhanced replica of the desired signals as successive signals are received. Means 18 includes phase detector 19, low pass filter 20 and voltage tuned oscillator 21 coupled in that order in a closed loop. Voltage tuned oscillator (VOTO) 21 may be of the conventional reactance tube type wherein the frequency of oscillation is varied by applying a control voltage to the reactance tube.

The output of phase detector 19 is also coupled to means for combining a portion of the detected increasing replica with the input signals from signal source 11 so as to degeneratively control the cumulative phase change of the carrier signal. This means for combining signals includes attenuator 22, coupled to the output of phase detector 19, and video subtractor 23 coupled to the outputs of both attenuator 22 and signal source 11. The output of video subtractor 23 provides the input to phase modulator 13.

In operation, the integrator is initially permitted to reach a stabilized operating condition before useful video information is extracted. During this initial period, radio-frequency oscillations at, for example, 20 megacycles, are built up in RF loop 12. Thermal noise excites RF loop 12 and, since the loop gain is unity and the loop is tuned to 20 megacycles, the oscillations increase to a level determined by the limiting action of post delay amplifier 16. The circulating 20 megacycle carrier signal is compared with the output of voltage tuned oscillator 21 in phase detector 19. The output of phase detector 19 is a function of the phase difference between its two input signals. The low frequency component of the phase detector output is coupled to the frequency control portion of VOTO 21 by means of low pass filter 20 so as to lock the phase and frequency of VOTO 21 to the average phase and frequency of the carrier circulating around RF loop 12. When the system has settled out and the phase detector output decreases to zero the system is ready to process the radar signals.

The input signals from signal source 11 include desired signals which recur with a substantially fixed repetition period, undesired random noise and undesired signals which do not recur with the desired repetition period. The signals initially pass directly through video subtractor 23 and vary the phase of the sample of the RF carrier signal circulating through phase modulator 13. The carrier, phase modulated by the signals received during the first radar repetition period, circulates around RF loop 12, and is delayed for one repetition period by delay line 15. The modulated carrier returns to phase modulator 13 as the next radar repetition period starts so that the modulation produced by corresponding signals received during the second radar repetition period is superimposed upon that produced by desired signals received during the first radar repetition period. Subsequent recurring signals produce a cumulative phase change of the sample of the carrier signal which is circulating around RF loop 12. The cumulative phase change is detected by means 18 so as to provide an enhanced, increasing replica of the desired signals as successive signals are received.

A portion of the output of phase detector 19 is fed back to video subtractor 23 and combined there with the signals from signal source 11 so as to degeneratively control the cumulative phase change of the circulating carrier signal. That is, the video output of phase detector 19 is multiplied by, for example, a factor of one-tenth in attenuator 22. The portion of the video signal so produced is then subtracted from the incoming video signals by subtractor 23. In this manner the modulation circulating around RF loop 12 will increase asymptotically towards an amplitude ten times as great as the video signals supplied by signal source 11.

When no new recurring input signals are received, the circulating modulation decays towards zero as the signal fed back through attenuator 22 and subtractor 23 is subtracted from the circulating information during each repetition period.

It can be seen that the signal recurring with a repetition period equal to the delay provided by delay line 15 cumulatively change the phase of the circulating carrier signal. However, signals which do not recur with that repetition period do not cumulatively modulate the carrier signal. Random noise on the average, does not cumulatively modulate the carrier signal. Therefore, those signals recurring with the desired repetition period produce an output which increases relative to the output produced by noise and undesired signals. It can be shown that the improvement in signal-to-noise ratio may be expressed as $$\frac{(1-\alpha^n)^2(1+\alpha)}{(1-\alpha)}$$

where:

$n$=number of recurring signals processed
$\alpha=1-$multiplication factor of attenuator 22.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An integrator for improving the signal-to-noise ratio of periodically recurring signals comprising:
means for producing a radio-frequency carrier signal;
means for causing the recurring signals to produce, during successive repetition periods, a cumulative phase change of said carrier signal;
means, for detecting said phase change to provide an enhanced replica of said recurring signals, including a source of reference phase oscillations, means for varying said reference phase to correspond with the average phase of said radio-frequency carrier signal and a phase detector responsive to the instantaneous phase difference between said reference phase oscillations and said carrier signal;
and means for subtracting a portion of said enhanced replica from said recurring signals so as to degeneratively control the cumulative phase change of said carrier signal.

2. An integrator for improving the signal-to-noise ratio of periodically recurring signals comprising:
means for producing a radio-frequency carrier signal;
means for causing the recurring signals to produce, during successive repetition periods, a cumulative phase change of said carrier signal;
means, for detecting said cumulative phase change to provide an increasing replica of said recurring signals as successive signals are received, including a source of reference phase oscillations, means for varying said reference phase to correspond with the average phase of said radio-frequency carrier signal and a phase detector responsive to the instantaneous phase difference between said reference phase oscillations and said carrier signal;
and means for subtracting a portion of said increasing replica from said recurring signal during each repetition period so as to limit the total cumulative phase change of said carrier signal and to reduce the cumulative change towards zero when said recurring signals cease.

3. An integrator for improving the signal-to-noise ratio of periodically recurring signals comprising:
means for producing a carrier signal;
means for causing the recurring signals to periodically vary the phase of a sample of said carrier signal, including means for phase modulating said sample with said recurring signals, means for delaying the modulated sample for a period equal to the repetition period of said recurring signals, and means for returning the delayed sample to said modulating means as the next recurring signal is received so as to produce a cumulative phase change of said carrier signal;
means, for detecting said cumulative phase change to provide an increasing replica of said recurring signals as successive signals are received, including a source of reference phase oscillations, means for varying said reference phase to correspond with the average phase of said radio-frequency carrier signal and a phase detector responsive to the instantaneous phase difference between said reference phase oscillations and said sample of said carrier signal;

and means for subtracting a portion of said increasing replica from said recurring signals during each repetition period so as to limit the total phase change of said sample produced by said recurring signals and to reduce the change towards zero when said recurring signals cease.

4. An integrator for improving the signal-to-noise ratio of periodically recurring signals comprising:

a source of input signals, said input signals including desired signals which recur with a substantially fixed repetition period and undesired signals which do not recur with said repetition period;

means for producing a carrier signal;

means for causing the input signals to periodically vary the phase of a sample of the carrier signal, including means for phase modulating said sample with said input signals, means for delaying the modulated sample for a period equal to the repetition period of said desired signals, and means for returning the delayed sample to said modulating means so that said desired signals produce a cumulative phase change of said carrier signal;

means, for detecting said carrier phase variations so as to provide an increasing replica of said desired signals as successive signals are received, including a source of reference phase oscillations, means for varying said reference phase to correspond with the average phase of said radio-frequency carrier signals and a phase detector responsive to the instantaneous phase difference between said reference phase oscillations and said sample of said carrier signal;

and means for subtracting a portion of said increasing replica from said input signals during each repetition period so as to limit the total cumulative change of said sample produced by said desired signals and to reduce said cumulative change towards zero when said desired signals cease.

5. An integrator for improving the signal-to-noise ratio of periodically recurring radar signals comprising:

a source of input signals, said input signals including desired radar signals which recur with a substantially fixed repetition period and undesired noise which does not recur with said repetition period;

a closed loop oscillatory system tuned to a given frequency for producing a continuous wave carrier signal at said frequency and for causing asid input signals to change the phase of a sample of said carrier signal during each repetition period so that said desired radar signals produce a cumulative phase change thereof;

means, for detecting said carrier phase change so as to produce an increasing replica of said desired signals as successive input signals are received, including a voltage tunable oscillator for providing reference phase oscillations, a low pass filter for providing a signal to control the phase of said reference phase oscillations so as to correspond with the average phase of said radio-frequency carrier signal and a phase detector responsive to the instantaneous phase difference between said reference phase oscillations and said sample of said carrier signal;

and means for subtracting a portion of said detected carrier phase variation from said input signals during each repetition period so as to limit the total cumulative change of said sample produced by said desired signals and to reduce said cumulative change towards zero when said desired signals cease.

References Cited by the Examiner

UNITED STATES PATENTS

| | | | |
|---|---|---|---|
| 2,841,704 | 7/58 | Sunstein et al. | 343—17.1 |
| 3,028,487 | 4/62 | Losee | 328—109 |
| 3,044,060 | 7/62 | Varela | 343—17.1 |
| 3,092,778 | 6/63 | Siomko. | |

OTHER REFERENCES

"Frequency Modulation," by Marchand, pages 128–139, published 1948 by Murray Hill Books, Inc., New York, New York.

"Radio Engineering" by Terman 3rd ed., pages 522–525, 1947, published by McGraw-Hill Book Co., Inc., New York, N.Y.

The International Dictionary of Physics and Electronics, QS 5 15, 1961, Van Nostrand, pages 760, 498, 755, 347.

ARTHUR GAUSS, *Primary Examiner.*

JOHN W. HUCKERT, *Examiner.*